United States Patent [19]
Burrows

[11] 3,751,571
[45] Aug. 7, 1973

[54] REFRACTORY CEMENT LINING FOR CORELESS INDUCTION FURNACES

[75] Inventor: Owen M. Burrows, Holden, Mass.

[73] Assignee: Norton Company, Worcester, Mass.

[22] Filed: Mar. 29, 1972

[21] Appl. No.: 239,201

[52] U.S. Cl. ........................................ 13/35, 13/26
[51] Int. Cl. ........................................ F27d 1/10
[58] Field of Search .......................... 13/26, 35, 27

[56] References Cited
UNITED STATES PATENTS
3,184,531  5/1965  McCreight et al. .................... 13/35

Primary Examiner—Roy N. Envall, Jr.
Attorney—Rufus M. Franklin

[57] ABSTRACT

A multi strata refractory lining for coreless induction furnaces, formed from a castable refractory cement. The composition of the cement is preferably a mixture of fused or dead burned spinel, magnesia and/or alumina aggregate, a lesser amount of reactive magnesia, and a small amount of an organic acid. When the cement is cast into the form of a lining in a furnace, cured, dried, and subjected to an initial metal melting run, a ceramically set or sintered crust is formed on the inner surface of the lining and a soft, friable zone adjacent thereto. This combination results in a superior lining in that when the inevitable cracks develop in the furnace lining, they can propagate only through the hard sintered inner facing of the furnace lining, terminating at the soft zone. The failure of the cracks to propagate completely through the lining prevents run-out of the molten metal thus greatly extending the life of the lining.

3 Claims, 1 Drawing Figure

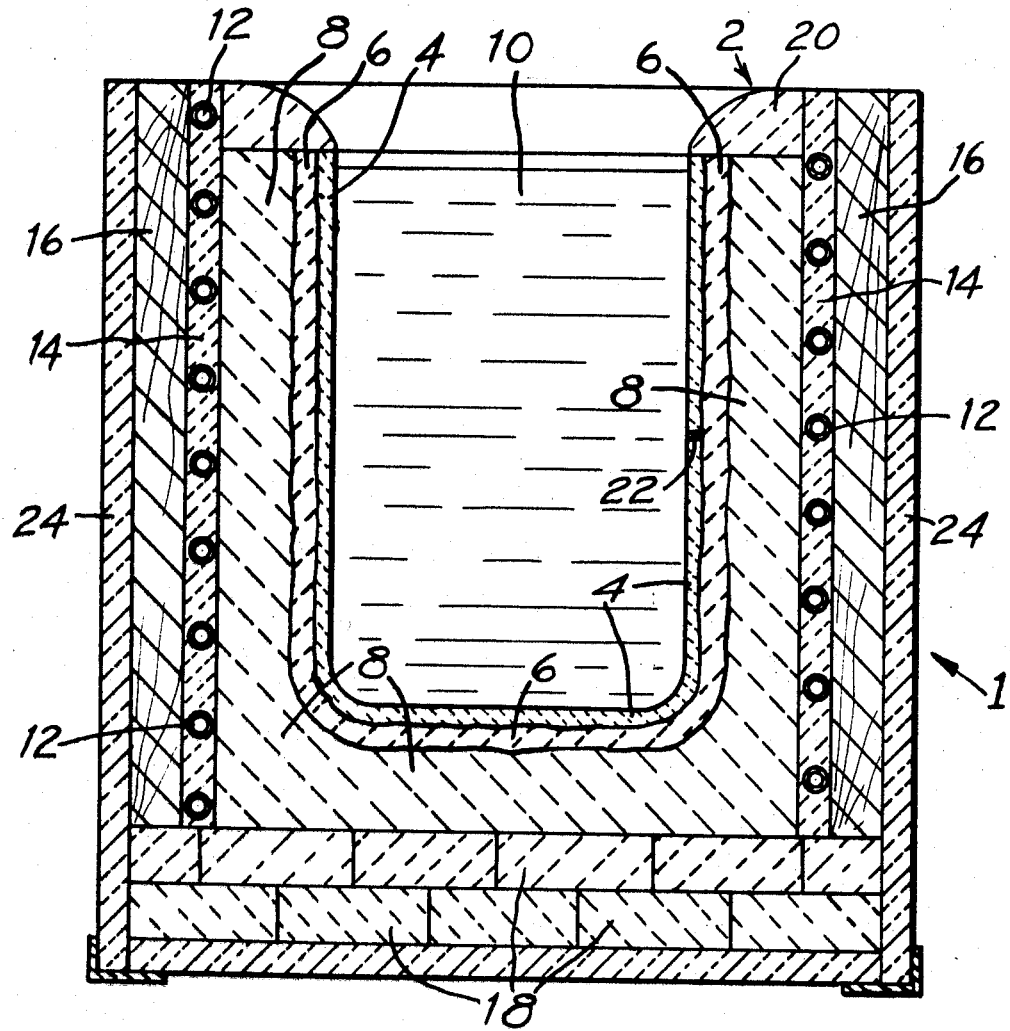

REFRACTORY CEMENT LINING FOR CORELESS INDUCTION FURNACES

BACKGROUND OF THE INVENTION

The invention relates to metal melting coreless induction furnaces and more particularly to refractory linings therefor.

In recent years the use of induction furnaces for metal melting has grown at a rapid rate. As a result, more stringent demands are being made on the refractory linings. At present, linings for coreless induction furnaces are formed from refractory ramming cements which are composed of a refractory aggregate and a bond. Quartzite, calcined zircon, calcined fire clay, calcined kyanit, calcined or fused alumina, or, calcined or fused magnesia is generally the refractory aggregate. The bond for the aggregate is clay or a so-called chemical bond such as arises by addition of an inorganic acid to the aggregate.

Despite the wide use of the foregoing cements, they possess several rather serious shortcomings as ramming cements for the formation of linings of coreless induction furnaces. Clay bonded alumina cements are generally too bulky for optimum dry ramming, subject to attack by basic slag, and have a propensity to form layers in ramming. Sintered alumina cements, on the other hand, require very high maturing temperatures, shrink substantially and permanently upon heating, and are often highly permeable. Clay bonded magnesia cements are susceptible to attack by acid slag, the clay and magnesia form a low melting eutectic, and, like their alumina counterparts, are too bulky for ease of ramming. Fully sintered magnesia cements shrink substantially on heating and are also highly permeable.

A futher fault of the prior art cements, and perhaps the most serious one with respect to their use in coreless induction furnace for metal melting, is that most of these form a lining which is hard and rigid through the full thickness of the lining. In the typical operation of a coreless furnace each melt is poured out completely and cold metal is introduced into the furnace. This facilitates a rapid change in the temperature in the refractory lining resulting in severe thermal stresses therein. Cracks are initiated in the inner surface of the lining and because the lining is hard and rigid throughout, the cracks propagate outwardly through the full thickness of the lining thus exposing the induction coils to runout of molten metal.

The principal object of the present invention is to provide a refractory cement lining for coreless induction furnaces that is more readily and economically installed and which remains free of cracks that traverse the entire thickness of the lining for a substantially greater number of melts than prior art cements.

SUMMARY OF THE INVENTION

The invention is a cast refractory lining for coreless induction furnaces. Compositionally, the lining is essentially an aggregate of fused and/or dead burned magnesia, alumina, spinel, or mixtures thereof, which is bonded with hydraulically set reactive magnesia containing relatively minor amounts of the magnesium salt of an organic acid, the organic acid salt being introduced originally as an acid which subsequently reacts with the reactive magnesia to form said salt.

Physically, the present lining is made up of a hard sintered inner face, a soft, friable zone adjacent thereto, and a relatively hard outer zone of cured (hydraulically set) but not sintered, refractory cement. The tri-zone nature of the lining is created when the inner face of an already cast and cured lining is sintered, preferably by conducting a metal melting run in the lined coreless induction furnace. Because of the natural temperature gradient through such a furnace lining, decreasing greatly from the inner face in contact with the molten metal to the outer surface of the lining, the tri-zone character of the lining appears when the lining is subject to an initial metal melting run.

The advantage of the present lining is that when the sintered refractory face of the lining develops cracks, as it inevitably will from the sharp and sudden temperature drop to which it is subjected when the melted metal is poured out, the cracks in the face will stop at the soft, friable zone rather than traversing through the complete thickness of the lining which is what occurs with prior art refractory linings. Thus in the present linings, runout of molten metal is prevented by the inherent ability of the lining to prevent cracks from traversing completely through. This problem with prior art induction furnace linings is greatly diminished by surrounding the hard refractory lining with a layer of loose or unsintered material, thus providing a crack terminating means similar in its function to the soft, friable zone of the present invention. The prior art approach, however, is not a monolithic structure and involves the two separate steps of preparing the sintered lining and preparing the back-up portion therefor.

As the present lining is subjected to metal melts subsequent to the initial one, the hard, sintered zone gradually increases in thickness of the lining with each run, until finally the entire thickness of the lining is sintered. When this stage in the history of a given lining has been reached, the cracks will traverse completely through the lining and the furnace should be relined. The lining has the advantage of being a cast lining, a unitary or monolithic structure, and capable of longer useful life than linings for coreless induction furnace heretofore.

BRIEF DESCRIPTION OF THE DRAWING

FIG. 1 is an elevated side view of a section through a coreless induction furnace according to the present invention.

DESCRIPTION OF THE PREFERRED EMBODIMENTS

In forming a typical refractory lining of the present invention a castable cement is prepared from a fused or dead burned magnesia, alumina, and/or spinel aggregate, lightly calcined reactive magnesia, a small quantity of an organic acid, and a sufficient amount of water to make the mixture castable. An appropriate amount of the castable cement slurry is poured or scooped into the bottom of the furnace to be lined so as to provide a floor of desired thickness. This is rodded with, for example, a forked tool or flat bar to facilitate removal of entrapped air. An inner form is then located concentrically within the furnace and more cement slurry is poured or cast between the outer wall of the form and the inner wall (which is made up of the mudded induction coils) thus forming the vertical wall of the lining. This too should be rodded to remove air bubbles. In rodding, care should be exercised so as to avoid rodding to such a degree that grain separation results.

When the cast wall has stiffened the topping or upper edge of the lining, including the pouring spout, is formed in the conventional manner.

The furnace is then covered to prevent excessive evaporation of the water, and the covered furnace is allowed to stand until the lining (and topping) become hard. The lining is then dried slowly in a drying oven at about 200°F, or with a lazy gas flame, or heating lamps. The drying must be done slowly and at a relatively low temperature to avoid the rapid generation of substantial amounts of steam which can seriously damage the lining. When dry, the inner form and braces and the like associated therewith are removed and the furnace is ready for use i.e. a metal melting run, which is the last step in the preparation of the invention lining.

Cold metal is then placed in the furnace and inductive heating is commenced at a power input low enough so that the rate of heating of the metal does not exceed 100°F per hour until the temperature reaches about 600°F. After a 3 to 8 hour soak at 600°F the power input is increased so that the heat-up rate is 200°F per hour until the temperature attains 1800°F where it is held constant for a second soak of 3 to 8 hours. Then the temperature is raised further to the desired metal temperature, preferably 100° to 200°F above the intended pouring temperature. At this time more metal is added to bring the level of the molten metal up to about two inches above the junction of the invention lining and the topping.

At this point the refractory lining of the present invention is complete and is as schematically shown in FIG. 1. In FIG. 1 the furnace 1 resting on the refractory brick base 18, the entire assembly being contained in a transite frame or box 24, is constructed of an insulating frame or support 16 made of for example wood, to which the induction coils 12 are affixed. The coils are mudded with a plastic cement 14 such as a clay bonded alumina. The refractory lining 2 is composed of the topping 20 and the lining proper, which is esssentially a monolithic structure but one which is composed of 3 distinct strata or zones. The inner face zone 4, which has been or is in contact with the molten metal 10, is hard and sintered. Adjacent to this is the soft friable zone 6. The third zone of the lining is the hard but non-sintered, hydraulically set stratum 8. The tri-zone character of the lining results from the natural temperature gradient which is created by melting the metal via coreless induction heating.

The tri-zone make-up of the lining proper is the essence of the present invention. The sintered inner face will inevitably develop cracks when the furnace lining cools substantially upon pouring of the molten metal and addition thereto of cold metal for a subsequent melting run. However, because of the soft friable zone adjacent to the sintered inner face, the cracks will stop there and will not traverse the entire thickness of the lining as shown at 22 in FIG. 1. Thus dangerous and costly metal runout to the induction coils is prevented. The prior art also teaches a method of preventing runout to the coils but this is accomplished by a two step method viz. the preparation of a crumbly backing zone adjacent to the mudded coils to which is fitted a sintered refractory crucible; this is not a monolithic structure.

As the present furnace lining is used in subsequent melting runs, the sintered refractory zone 4 and the soft friable zone 6 gradually move through the complete thickness of the lining 2 toward the mudded coils, and the unsintered hydraulically set zone 8 gradually disappears. When after numerous melting runs the entire lining has become sintered it must then be removed and replaced. This replacement is greatly facilitated by locating a sheet of asbestos or the like between the refractory lining 2 and the mudded coils.

In some instances, depending on the composition of the metal to be melted, it is advantageous to include in the aggregate 0 to 30 percent by weight of magnesia, alumina or zirconia. Thus, where the principal aggregate is fused or dead burned magnesia, then 0 – 30 percent fused or dead burned alumina or zirconia may be incorporated. Similarly, if the principal aggregate is fused or dead burned alumina, then 0 – 30 percent of fused or dead burned magnesia or zirconia may be advantageously incorporated in the aggregate.

The particle size of the aggregate is a size range of graded particle sizes, rather than a particular particle size, for example "6 grit and finer" is a very commonly used aggregate size. However, the coarsest grit size in the range is not critical but is usually dictated by circumstances such as the thickness of the lining. The same is true with respect to the active magnesia bond. However the latter is desirably somewhat finer in the coarsest particle size. For most applications, the particulate materials should have a graded particle size range of 0.5 inch and finer.

So far as concerns the relative amounts of aggregate, reactive magnesia bond and organic acid used to make up the castable cement, the preferred compositional range is:

|  | Parts by Weight |
|---|---|
| aggregate | 80–97 |
| active magnesia | 3–20 |
| organic acid | 0.5–5 |

Mixtures within these ranges, when mixed with approximately 10 to 15 parts by weight of water, produce suitable castable cement mixture. Further, with respect to the acid, greater or lesser amounts are operable and the acid may be essentially any carboxylic acid.

Whenever the aggregate contains alumina, some spinel will be formed in the sintered zone of the lining. As the sintered zone progresses through the thickness of the lining, as discussed above, the amount of spinel present will increase. This is in no way detrimental to the quality of the lining. Where the aggregate is solely fused or dead burned magnesia, then no spinel formation can occur. Similarly, when the aggregate is solely spinel, then no new spinel formation can occur.

EXAMPLE I

A refractory lining for a 100 pound capacity coreless induction furnace was prepared as follows:

A thick cement slurry was prepared which consisted of 67 pounds of fused magnesia in graded sizes of 6 grit and finer, 25 pounds of fused alumina in graded sizes of 24 grit and finer, 8 pounds of a powdered reactive magnesia, 0.5 pounds of oxalic acid, and 12.5 pounds of water. A quantity of the cement slurry was scooped into the bottom of the furnace so as to provide a floor therein which was approximately 7 inches thick; this was rodded with a forked tool to allow air bubbles to escape. A cylindrical sheet metal form 7.5 inches in diameter and 15 inches high was placed centrally in the furnace chamber and was braced so as to prevent the form from becoming dislocated when the cement for the wall of the lining is introduced. Cement slurry was then poured, around the form, in increments with each increment being rodded, until the proper wall height was attained. This was allowed to stand until the cement slurry stiffened. The topping, including the pouring spout, were formed in place. The entire assembly was then covered to prevent evaporation and allowed to remain covered overnight. The cover was then removed and the assembly placed in a drying oven where the lining was dried at 200°F for 24 hours. Subsequent to the drying cycle, the assembly was removed from the oven and the cylindrical form and its braces were removed.

The furnace was then filled with cold iron and the power input to the furnace was regulated and set so as to cause a temperature rise in the metal of about 100F° per hour. When the temperature of the metal reached 600°F it was held constant for 5 hours after which the temperature was increased at a rate of 200F° per hour until a temperature of 1800°F where the temperature was again held constant for approximately 5 hours. The temperature of the metal was further increased at a rate of 200F° per hour until the temperature of the metal was 100°– 200F° above the intended pouring temperature and held at that temperature for 2 hours.

At this point, the invention lining was fully developed as shown in FIG. 1, having a hard sintered refractory inner face 4, an adjacent soft, friable zone 6, and a hard but unsintered outer zone 8.

The molten iron was cast into ingots and the furnace was ready for further melting runs.

EXAMPLE II

A refractory furnace lining wherein the aggregate was exclusively alumina, was formed in the same manner as described in Example I. The castable cement utilized was made up of 87 pounds of fused alumina, 5 pounds of dead burned (calcined) alumina, 7.5 pounds of reactive magnesia, 0.5 pound of oxalic acid, and 11 pounds of water.

What is claimed is:

1. In a coreless induction furnace, an essentially monolithic refractory cement lining, the thickness of said lining consisting of:
   a. a sintered inner face,
   b. a soft, friable zone adjacent to said inner face, and
   c. a relatively hard outer zone of cured, but not sintered, refractory cement, said refractory cement consisting essentially of an aggregate of a dead burned or fused metal oxide selected from the group consisting of magnesia, alumina, and spinel, and mixtures thereof reactive magnesia bond, and 0 to 30 percent by weight of zirconia oxide.

2. The refractory cement lining of claim 1 consisting essentially of from 80 to 97 percent by weight of fused or dead burned magnesia made up of graded particle sizes, the coarsest being approximately 0.5 inch in cross section, and 3 to 20 % by weight of reactive powdered magnesia.

3. The refractory cement lining of claim 1 consisting essentially of from 80 to 97 percent by weight of nonreactive alumina, 3 to 20 percent by weight of reactive magnesia, said alumina and said magnesia being made up of graded particle sizes, the coarsest being approximately 0.5 inch in cross section.

* * * * *